(12) United States Patent
Sugiura et al.

(10) Patent No.: US 7,575,825 B2
(45) Date of Patent: Aug. 18, 2009

(54) POWER SUPPLY SYSTEM AND CONTROL METHOD OF THE SAME

(75) Inventors: Hiroshi Sugiura, Tigasaki (JP); Tetsuhiro Ishikawa, Nishikamo-gun (JP); Masao Ando, Chita (JP); Kenji Kato, Kariya (JP)

(73) Assignees: Toyota Jidosha Kabushiki Kaisha, Toyota (JP); Kabushiki Kaisha Equos Research, Tokyo (JP)

( * ) Notice: Subject to any disclaimer, the term of this patent is extended or adjusted under 35 U.S.C. 154(b) by 314 days.

(21) Appl. No.: 10/401,773

(22) Filed: Mar. 31, 2003

(65) Prior Publication Data

US 2003/0194586 A1 Oct. 16, 2003

(30) Foreign Application Priority Data

Apr. 11, 2002 (JP) ............................. 2002-109386

(51) Int. Cl.
*H01M 8/00* (2006.01)
(52) U.S. Cl. .......................................... 429/22; 429/13
(58) Field of Classification Search .................. 429/13, 429/22
See application file for complete search history.

(56) References Cited

U.S. PATENT DOCUMENTS

| 6,380,638 | B1 | 4/2002 | Bitsche et al. |
| 6,488,345 | B1 * | 12/2002 | Woody et al. ............... 303/152 |
| 6,496,393 | B1 * | 12/2002 | Patwardhan ................. 363/70 |
| 6,777,909 | B1 | 8/2004 | Aberle et al. |
| 6,828,051 | B2 * | 12/2004 | Yamanashi ................... 429/24 |
| 2001/0024105 | A1 | 9/2001 | Abe |
| 2003/0044658 | A1 | 3/2003 | Hochgraf et al. |
| 2003/0118876 | A1 | 6/2003 | Sugiura et al. |

FOREIGN PATENT DOCUMENTS

| DE | 198 10 467 C1 | 10/1999 |
| DE | 199 54 306 A1 | 7/2001 |
| DE | 101 14 011 A1 | 10/2001 |
| DE | 101 09 151 A1 | 9/2002 |
| DE | 102 40 763 A1 | 4/2003 |
| DE | 102 60 013 A1 | 7/2003 |
| JP | A-2000-012059 | 1/2000 |
| JP | A 2001-307758 | 11/2001 |
| JP | A-2002-093443 | 3/2002 |
| WO | WO 01/92050 A1 * | 12/2001 |

* cited by examiner

*Primary Examiner*—Patrick Ryan
*Assistant Examiner*—Keith Walker
(74) *Attorney, Agent, or Firm*—Oliff & Berridge, PLC

(57) ABSTRACT

A power supply unit operation is switched depending on a load requirement. Namely, when the load requirement is smaller than a predetermined value, operation of a fuel cell system is stopped and electric power is obtained from a secondary battery during an intermittent operation mode. Alternatively, when the load requirement is equal to or larger than the predetermined value, the electric power is obtained from a fuel cell during a steady operation mode.

8 Claims, 13 Drawing Sheets

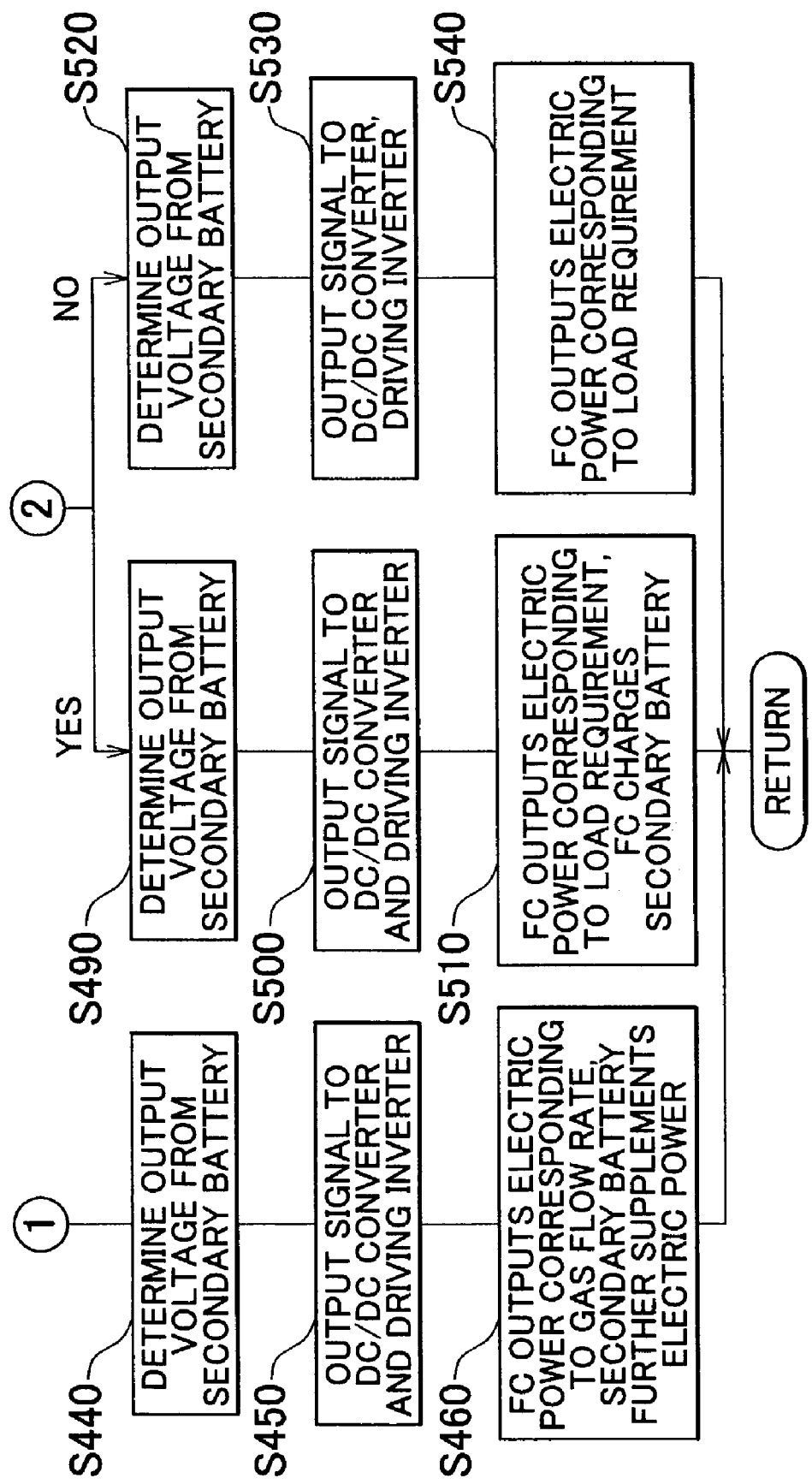

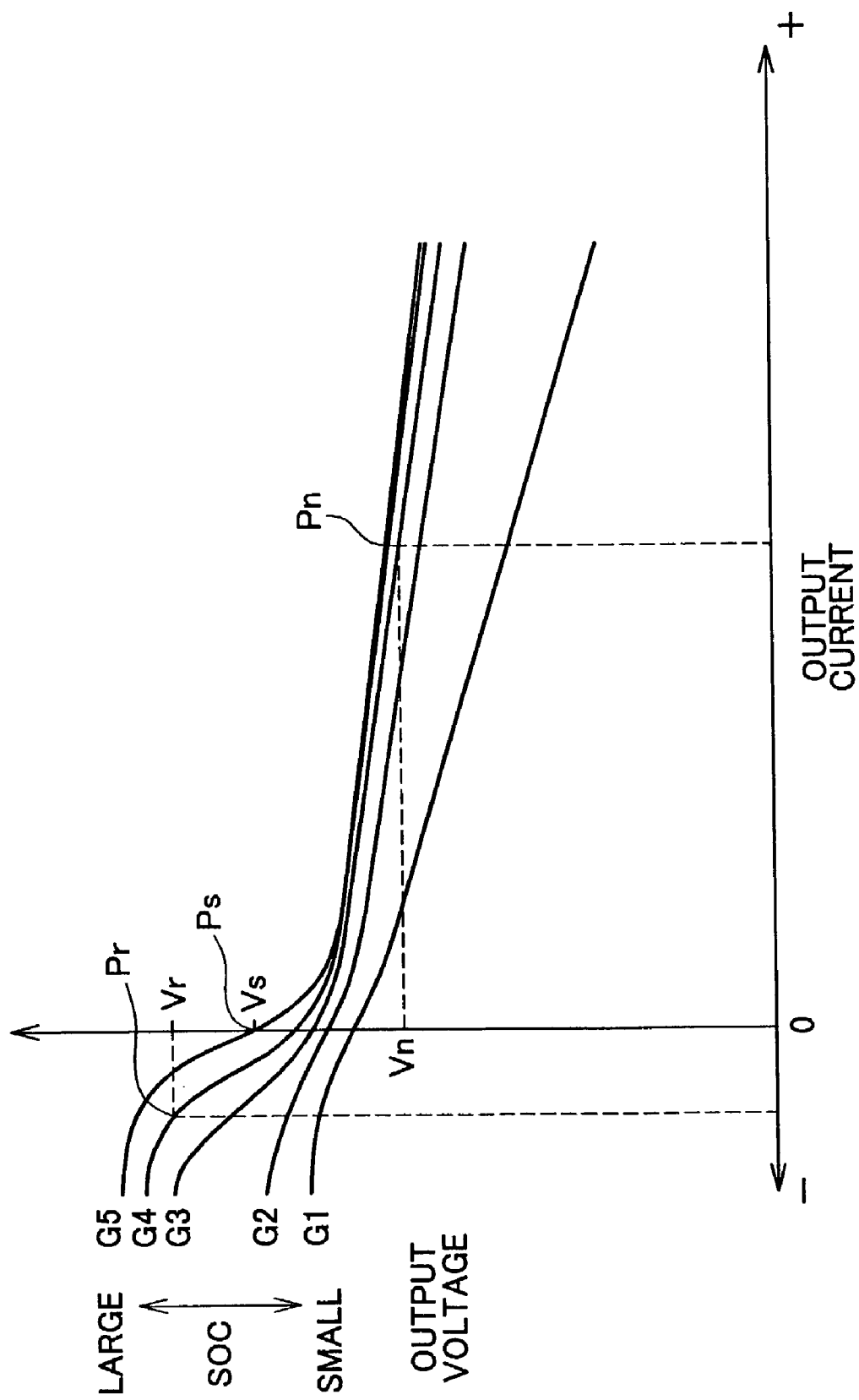

POWER SUPPLY SYSTEM AND CONTROL METHOD OF THE SAME

INCORPORATION BY REFERENCE

The disclosure of Japanese Patent Application No. 2002-109386 filed on Apr. 11, 2002 including the specification, drawings and abstract is incorporated herein by reference in its entirety.

BACKGROUND OF THE INVENTION

1. Field of Invention

The invention relates to a power supply system including a fuel cell and a battery, and a control method thereof.

2. Description of Related Art

A fuel cell obtains an electromotive force when an electrochemical reaction of a fuel gas including hydrogen and an oxidizing gas including oxygen occurs. In a fuel cell system, hydrogen, which is drawn out from a hydrogen tank, is used as the fuel gas, and compressed air which is taken in by an air compressor is used as the oxidizing gas.

When the fuel cell is activated, operations of drawing out the hydrogen from the hydrogen tank and driving the air compressor are simultaneously started. For a while after the fuel cell is activated, the amount of the supplied fuel gas and the supplied oxidizing gas may not reach the amount necessary to generate electric power (target electric power) required by a load. For example, since it takes a predetermined time until the air compressor reaches a state (steady state) in which the air compressor can take in a predetermined amount of oxygen after being activated, the amount of the oxidizing gas may become insufficient in the fuel cell during the predetermined period of time. When the amount of the supplied fuel gas and oxidizing gas becomes insufficient with respect to the target electric power, trouble such as a voltage drop is caused in the fuel cell. Therefore, there is related art in which electric power (target amount of electric power generation) that needs to be generated by the fuel cell is set based on a flow rate of the fuel gas and the oxidizing gas which are actually supplied so as to prevent the amount of the gas from becoming insufficient.

However, when the target amount of electric power generation is set based on the amount of the actually supplied gas, the target electric power which is required by the load cannot be sufficiently obtained within the predetermined period of time after the activation of the fuel cell. Accordingly, for example, when the fuel cell system is mounted as a power supply for driving a vehicle, sufficient acceleration performance cannot be obtained within the predetermined period of time after the activation of the fuel cell arises.

SUMMARY OF THE INVENTION

The invention is made in order to solve the above-mentioned problem. It is an object of the invention to provide art for securing sufficient generation of electric power at the activation time of the fuel cell in a power supply system including a fuel cell and a battery.

In order to attain the above-mentioned object, a control method of the power supply system in which the fuel cell and the battery are connected in parallel by wiring of the power supply, which is a first aspect of the invention, includes activating the fuel cell, obtaining a load requirement that indicates electric power that is required by the power supply system, measuring a time which has elapsed since the fuel cell was activated and obtaining information regarding an amount of fuel actually supplied to the fuel cell. Moreover, the control method includes comparing the elapsed time with a predetermined reference time, setting a target power which needs to be output from the fuel cell based on the load requirement regardless of the amount of the fuel when it is determined that the elapsed time is equal to or shorter than the reference time and setting a target power which needs to be output from the fuel cell in accordance with the amount of the fuel actually supplied to the fuel cell when it is determined that the elapsed time exceeds the reference time.

According to the first aspect, when the time that has elapsed since the fuel cell was activated is within the reference time, electric power corresponding to the load requirement can be obtained from the fuel cell regardless of the amount of fuel which is actually supplied to the fuel cell.

In this case, the activation of the fuel cell corresponds to starting a supply of the fuel (the fuel gas including hydrogen and the oxidizing gas including oxygen) to the fuel cell. Also, the load requirement is input from an outside as an amount of the electric power which needs to be supplied from the power supply system to the load. When the fuel cell is activated, it takes time until a device which supplies the fuel to the fuel cell is brought into a steady state (an operation state in which an amount of fuel corresponding to a drive signal is supplied). Accordingly, for a while after the fuel cell is activated, the amount of the fuel which is supplied from the device for supplying the fuel to the fuel cell may become too insufficient to generate electric power corresponding to the load requirement.

By adopting a control method of the power supply system according to the invention, it becomes possible to sufficiently secure the electric power which can be obtained from the fuel cell, even during a period until the device for supplying the fuel is brought into the steady state. At this time, the fuel cell generates electric power using the fuel which remains in a fuel passage that connects the device for supplying the fuel to the fuel cell.

In the control method of the power supply system according the first aspect of the invention, the power supply system may include a first operation mode in which operation of the fuel cell is stopped and the electric power is supplied to the load by the battery, and a second operation mode in which electric power is generated using the fuel cell, and may continue the operation of the power supply system while switching the operation mode between the first operation mode and the second operation mode depending on the load requirement. In addition, the activation of the fuel cell in the step (a) may be performed when the operation mode is switched from the first operation mode to the second operation mode.

By adopting such a control method of the power supply system, when the control is continuously performed in which the operation mode is switched between the first operation mode and the second operation mode (depending on the load), an output from the fuel cell can be inhibited from becoming insufficient each time the operation mode is switched to the second operation mode.

The invention can be embodied in a variety of forms other than the above-mentioned form. For example, the invention may be configured so as to be embodied in forms such as a power supply system including a fuel cell and a battery, an electric vehicle on which the power system is mounted, or a control method of the electric vehicle.

BRIEF DESCRIPTION OF THE DRAWINGS

FIGS. 10A and 10B are a flowchart showing a steady operation mode control processing routine which is performed in a control portion of the electric vehicle;

FIG. 11 is an explanatory view showing an example of an output current-output voltage characteristic when SOC varies in a secondary battery.

DETAILED DESCRIPTION OF PREFERRED EMBODIMENTS

First, an entire configuration of a device according to an embodiment of the invention will be explained.

Figure 1:
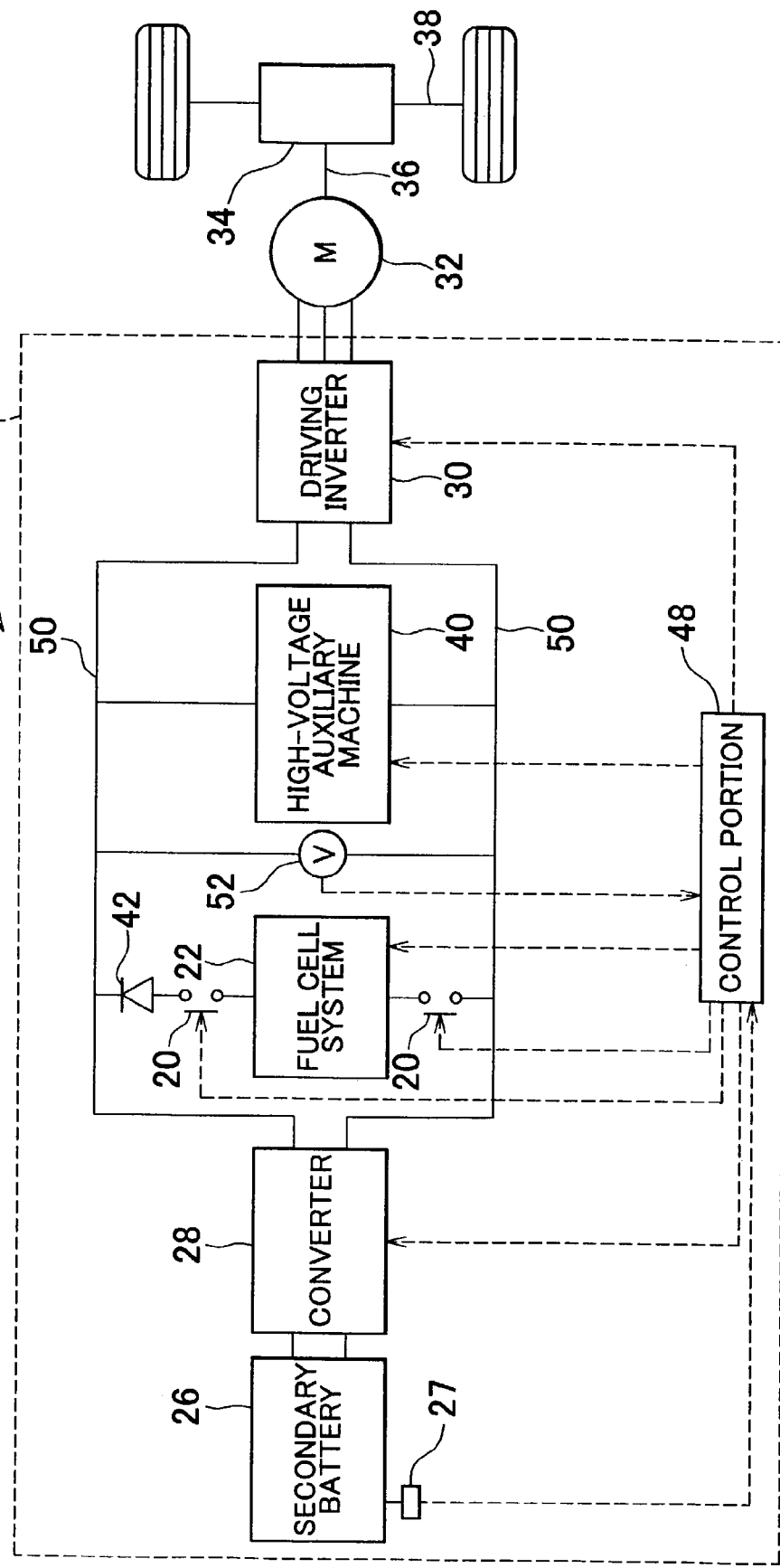
FIG. 1 is an exemplary block diagram showing a schematic configuration of an electric vehicle according to a first embodiment of the invention.

FIG. 1 is an exemplary block diagram showing a schematic configuration of an electric vehicle 10 according to a first embodiment of the invention. The electric vehicle 10 includes a power supply unit 15. As loads to which electric power is supplied from the power supply unit 15, a high-voltage auxiliary machine 40 and a driving motor 32 which is connected to the power supply unit 15 through a driving inverter 30 are provided. Wiring 50 is provided between the power supply unit 15 and the loads, and the electric power is exchanged between the power supply unit 15 and the loads through the wiring 50.

The power supply unit 15 includes a fuel cell system 22 and a secondary battery 26. The fuel cell system 22 includes a fuel cell which is a main body for power generation, as will be described later. The secondary battery 26 includes a fuel cell which is a main body of the power generation, as described later. The secondary battery 26 is connected to the wiring 50 through a DC/DC converter 28, and the DC/DC converter 28 and the fuel cell included in the fuel cell system 22 are connected in parallel by the wiring 50. A diode 42 for preventing an electric current from flowing back to the fuel cell is further provided on the wiring 50. Further, a switch 20 for switching the connection of the fuel cell to the wiring 50 is provided on the wiring 50. Also, in order to measure a voltage in the power supply unit 15, a voltmeter 52 is further provided on the wiring 50.

Figure 2:
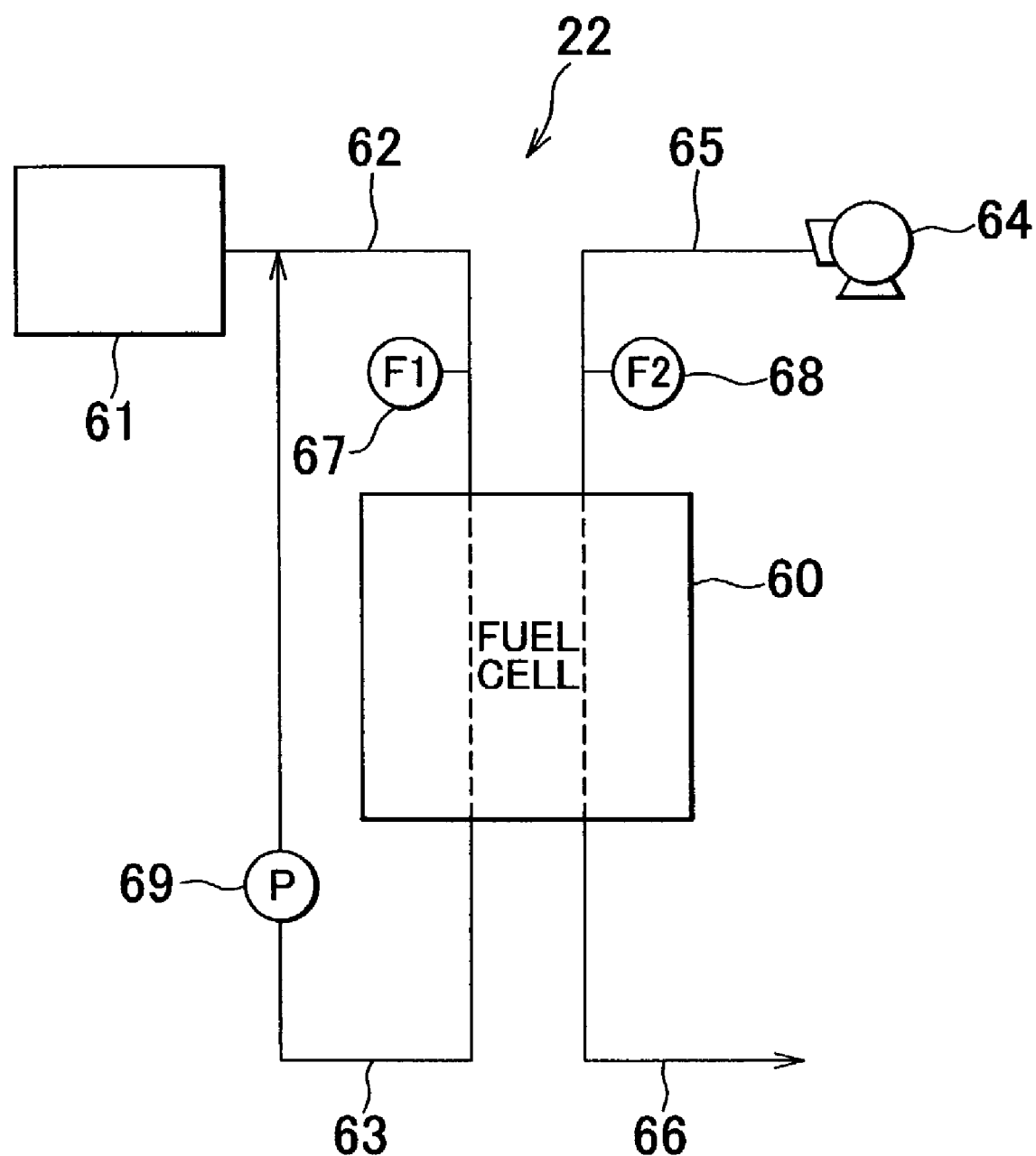
FIG. 2 is an explanatory view showing a schematic configuration of a fuel cell system.

FIG. 2 is an explanatory view showing a schematic configuration of the fuel cell system 22. The fuel cell system 22 includes a fuel cell 60, a fuel gas supplying portion 61, and a blower 64. In the embodiment, a proton-exchange membrane fuel cell is used as the fuel cell 60.

The fuel gas supplying portion 61 is a device for storing hydrogen therein and for supplying the hydrogen gas to the fuel cell 60 as the fuel gas. The fuel gas supplying portion 61 needs to include, for example, a hydrogen cylinder. Alternatively, the fuel gas supplying portion 61 may include a hydrogen tank having a hydrogen absorbing alloy therein, and may store the hydrogen by making the hydrogen absorbing alloy absorb the hydrogen. The hydrogen gas which is stored in the fuel gas supplying portion 61 is supplied to an anode of the fuel cell 60 through a hydrogen gas supplying passage 62 to be provided for an electrochemical reaction. The remaining hydrogen gas which is not used in the electrochemical reaction is released to a hydrogen gas releasing passage 63. The hydrogen gas releasing passage 63 is connected to the hydrogen gas supplying passage 62, and the remaining hydrogen gas is recirculated for the electrochemical reaction. Thus, a hydrogen pump 69 is provided in the hydrogen gas releasing passage 63 so as to circulate the remaining hydrogen gas through the fuel cell 60.

Also, the compressed air which is taken in by the blower 64 is supplied to a cathode of the fuel cell 60 as the oxidizing gas through an oxidizing gas supplying passage 65. The cathode exhaust gas released from the fuel cell 60 is released outside through a cathode exhaust gas passage 66. Flow rate sensors 67, 68 for detecting the flow rate of the gas which passes through each passage are provided in the hydrogen gas supplying passage 62 and the oxidizing gas supplying passage 65 respectively. Also, a humidifier for humidifying the hydrogen gas or air may further be provided in the hydrogen gas supplying passage 62 and the oxidizing gas supplying passage 65.

As the secondary battery 26, various secondary batteries such as a lead storage cell, a nickel-cadmium storage cell, a nickel-hydrogen storage cell, and a lithium secondary battery can be used. The secondary battery 26 supplies electric power for driving each portion of the fuel cell system 22 when the fuel cell system 22 is activated, or supplies electric power to each load until the warm-up operation of the fuel cell system 22 is completed. In the case in which the fuel cell 60 generates electric power in the steady state, when the load is higher than a predetermined value, electric power may be supplemented by the secondary battery 26.

As shown in FIG. 1, a remaining capacity monitor 27 for detecting the remaining capacity (state of charge: SOC) of the secondary battery 26 is also attached to the secondary battery 26. In the embodiment, the remaining capacity monitor 27 is configured as an SOC meter which integrates a current value and time of charging and discharging performed in the secondary battery 26. Alternatively, the remaining capacity monitor 27 may be configured by a voltage sensor in place of the SOC meter. Since the voltage value of the secondary battery 26 drops with a decrease in the remaining capacity thereof, the remaining capacity of the secondary battery 26 can be detected by measuring the voltage.

The DC/DC converter 28 adjusts a voltage in the wiring 50 by setting a target voltage value of the output side, and thus adjusts the output voltage from the fuel cell 60 so as to control the amount of the electric power generated by the fuel cell 60. Also, the DC/DC converter 28 plays a role as a switch for controlling connection between the secondary battery 26 and the wiring 50. When the secondary battery 26 need not be charged or discharged, the DC/DC converter 28 disconnects the secondary battery 26 from the wiring 50.

The driving motor 32, which is one of the loads to which the electric power is supplied from the power supply unit 15, is a sychronous motor, and includes a three-phase motor for forming a rotating magnetic field. The driving motor 32 is supplied with electric power from the power supply unit 15 through the driving inverter 30. The driving inverter 30 is a transistor inverter which includes a transistor as a switching element corresponding to each phase of the driving motor 32. An output shaft 36 of the driving motor 32 is connected to a vehicle driving shaft 38 through a reduction gear 34. The reduction gear 34 transmits the power output from the driving motor 32 to the vehicle driving shaft 38 after adjusting the rotational speed.

Also, the high-voltage auxiliary machine 40, which is another load, is a device that uses the electric power supplied from the power supply unit 15 while the voltage remaining at a level equal to or higher than 300 V. Examples of the high-voltage auxiliary machine 40 are the blower 64 (refer to FIG. 2) for supplying air to the fuel cell 60, and the hydrogen pump 69 for circulating the hydrogen gas between the hydrogen gas releasing passage 63 and the hydrogen gas supplying passage 62. In addition, a cooling pump (not shown) for circulating a coolant in the fuel cell 60 so as to cool the fuel cell 60 is included in the high-voltage auxiliary machine 40. Although these devices are included in the fuel cell system 22, they are shown as the high-voltage auxiliary machine 40 outside the fuel cell system 22 in FIG. 1. Also, an example of the high-voltage auxiliary machine 40 other than the devices included in the fuel cell system 22 is an air conditioner that is provided in the electric vehicle 10.

Also, the electric vehicle 10 further includes a control portion 48. The control portion 48 is configured as a logical circuit including a microcomputer as a main portion thereof. More particularly, the electric vehicle 10 includes a CPU which performs a predetermined computation according to a preset control program, ROM in which a control program, a control data and the like that are necessary to perform various computation processing by the CPU are previously stored, RAM in which various data that are necessary to perform various computation processing by the CPU are temporarily read and written, an input and output port which inputs and outputs various signals, and the like. The control portion 48 obtains a signal which is detected by the aforementioned voltmeter 52, a signal which is output from the remaining capacity monitor 27, or an instruction signal which is input in relation to the vehicle operation. Also, the control portion 48 outputs a driving signal to the DC/DC converter 28, the switch 20, the fuel cell system 22, the driving inverter 30, the high-voltage auxiliary machine 40 and the like.

Next, an operation mode in the electric vehicle 10 will be explained.

Figure 3:
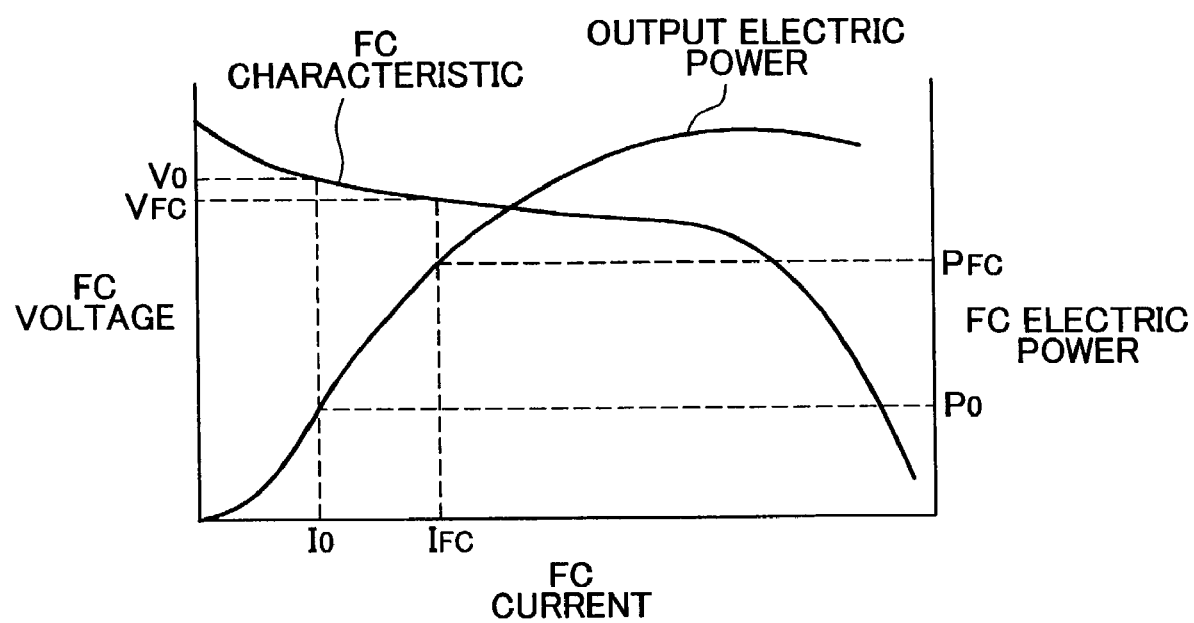
FIG. 3 is an explanatory view showing a relation between an output current, and an output voltage or output electric power from a fuel cell.

In the electric vehicle 10 according to the embodiment, energy which is necessary to drive the vehicle is mainly supplied from the fuel cell system 22. Hereinafter, an operation state in which the fuel cell 60 generates electric power corresponding to the magnitude of the load is referred to as a "steady operation mode". FIG. 3 shows a relation between an output current, and an output voltage or output electric power from the fuel cell 60. As shown in FIG. 3, when electric power $P_{FC}$ which needs to be output from the fuel cell 60 is determined, magnitude $I_{FC}$ of the output current from the fuel cell 60 at that time is determined. When the output current $I_{FC}$ is determined based on an output characteristic of the fuel cell 60, an output voltage $V_{FC}$ from the fuel cell 60 at that time is determined. When the steady operation mode is selected, the control portion 48 performs control so that the amount of the electric power generated by the fuel cell 60 becomes equal to a required amount by providing the DC/DC converter 28 with an instruction that the output voltage $V_{FC}$ thus determined is a target voltage. A value of the output voltage or a value of the output electric power which correspond to the output current from the fuel cell 60 shown in FIG. 3 vary depending on an internal temperature of the fuel cell 60. Therefore, when the output voltage (target voltage) $V_{FC}$ from the fuel cell 60 is determined in the above-mentioned manner, it is preferable that the internal temperature of the fuel cell 60 be further considered.

Also, in the electric vehicle 10 according to the embodiment, when the energy efficiency of the fuel cell system 22 is decreased to an undesirable level when the electric power is supplied in the steady operation mode, control is performed so as to stop the electric power generation by the fuel cell 60. Hereinafter, an operation state in which the electric power generation by the fuel cell 60 is stopped when the electric power is supplied to the load is referred to as an "intermittent operation mode".

Figure 4A:
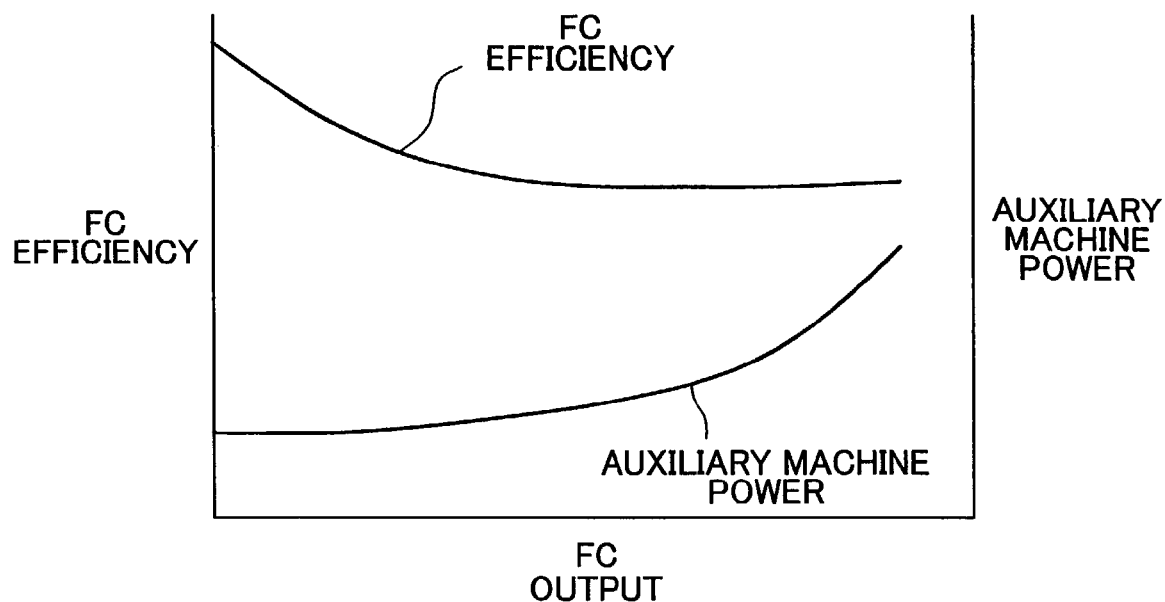
FIG. 4 is an explanatory view showing a relation between magnitude of an output and energy efficiency of the fuel cell.
Figure 4B:
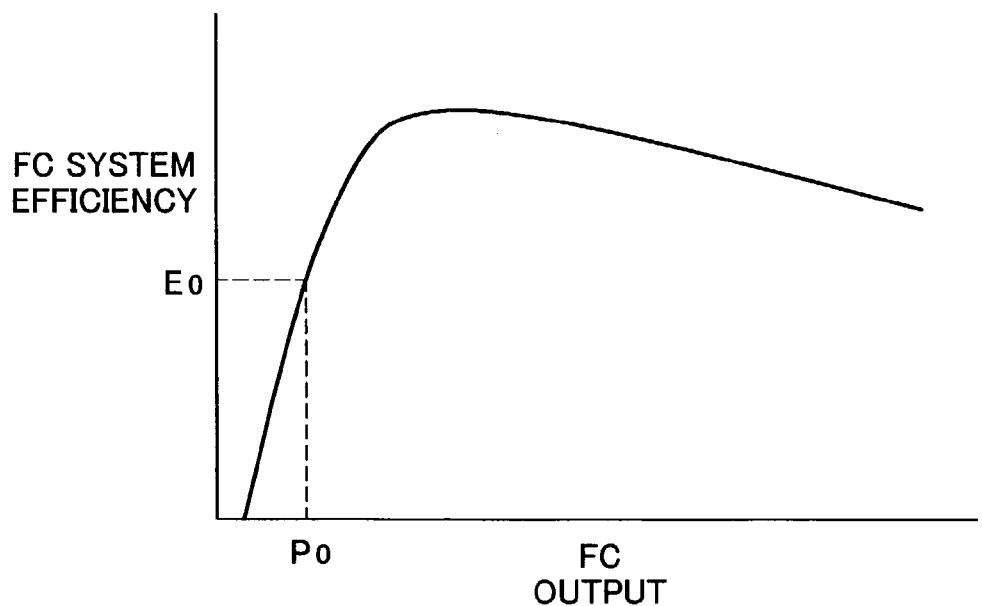

FIGS. 4A and 4B are explanatory views showing magnitude of the output from the fuel cell 60 and the energy efficiency. FIG. 4A shows a relation between the efficiency of the fuel cell 60 and the power required by a fuel cell auxiliary machine, and the output from the fuel cell 60. The fuel cell auxiliary machine is an auxiliary machine for generating electric power using the fuel cell 60. Examples of the fuel cell auxiliary machines are the aforementioned blower 64, the hydrogen pump 69, the coolant pump and the like. FIG. 4B shows a relation between the output from the fuel cell 60 and the efficiency of the entire fuel cell system 22. As shown in FIG. 4A, the efficiency of the fuel cell 60 is gradually decreased with an increase in the output from the fuel cell 60. Also, auxiliary machine driving power, that is, energy which is consumed to drive an auxiliary machine is increased with an increase in the output from the fuel cell 60. When the efficiency of the entire fuel cell system 22 is determined based on the efficiency and the auxiliary machine driving power shown in FIG. 4A, the system efficiency becomes the highest value when the output from the fuel cell 60 is at the predetermined value, as shown in FIG. 4B.

The magnitude of the electric power consumption of the fuel cell auxiliary machine is considerably small compared with magnitude of the electric power consumption of the driving motor 32. However, when the output from the fuel cell 60 is small, the amount of the electric power which is consumed by the fuel cell auxiliary machine for generating electric power becomes large compared with the amount of the electric power which can be obtained by generation of electric power. Accordingly, as shown in FIG. 4B, when the output from the fuel cell 60 is small, the energy efficiency of the entire fuel cell system 22 becomes low. In the electric vehicle 10 according to the embodiment, when the load is low, that is, when the efficiency of the entire fuel cell system 22 deteriorates (when the output from the fuel cell 60 becomes smaller than $P_0$ shown in FIG. 4B, and the efficiency of the entire system is decreased to a level lower than $E_0$), the energy efficiency is prevented from being decreased by adopting the intermittent operation mode in which the operation of the fuel cell 60 is stopped.

In addition, in the electric vehicle 10, at the time of braking operation (when the driver performs an operation of depressing the brake pedal while the vehicle is running), kinetic energy of an axle is converted into electric energy by using the driving motor 32 as a power generator, and the converted energy is recovered. An operation state in which the energy is recovered at the time of braking operation is referred to as a "regenerative operation mode". In the electric vehicle 10, the energy which is recovered as electric power in the regenerative mode is absorbed by the secondary battery 26. In the electric vehicle 10, when the electric vehicle 10 is brought into the regenerative mode and the driving motor 32 generates electric power, the electric power is supplied from the driving motor 32 side to the wiring 50 through the driving inverter 30. At this time, the electric power is supplied from the wiring 50 to the secondary battery 26 through the DC/DC converter 28, and the secondary battery is charged. When it is determined that the secondary battery 26 is substantially fully charged based on the result of detection by the remaining capacity monitor 27, the secondary battery 26 is not charged in the above-mentioned manner even at the braking operation time.

Figure 5:
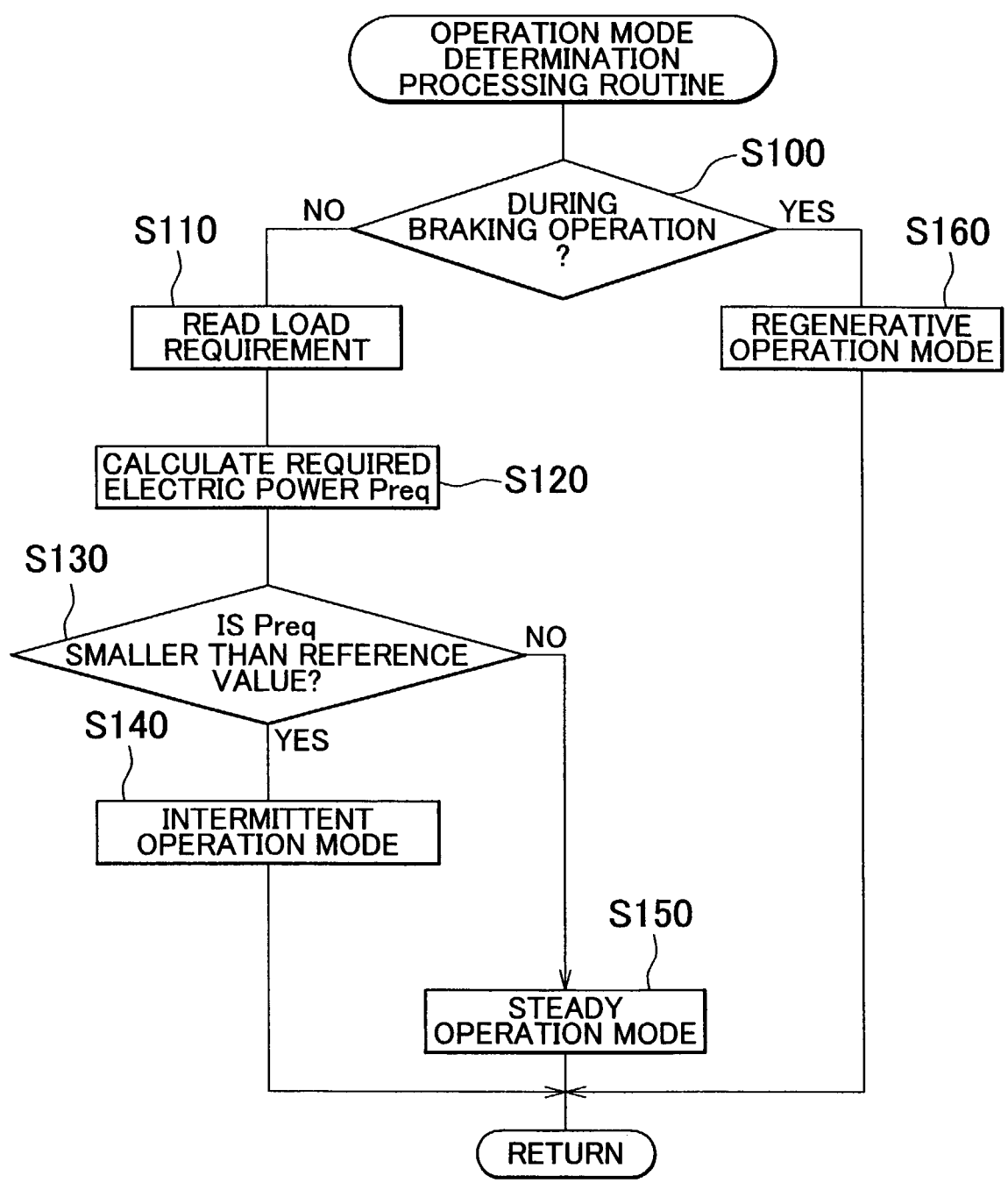
FIG. 5 is a flowchart showing an operation mode determination processing routine.

FIG. 5 is a flowchart showing an operation mode determination processing routine for selecting an operation state in the electric vehicle 10. The routine is performed in the control portion 48 at predetermined intervals while an operation using the power supply unit 15 is being performed after warm-up operation is completed in the electric vehicle 10.

When the routine is performed, the control portion 48 determines whether the braking operation is being performed (step S100). When it is determined that the braking operation is not being performed, the control portion 48 reads a load requirement (step S110). The load requirement is the electric power required by the driving inverter 30 to realize a required running state, and is determined based on a vehicle speed and an accelerator opening of the electric vehicle 10.

Next, required electric power $P_{req}$ which is required by the power supply unit 15 is calculated based on the load requirement that is read in step S110 (step S120). When the required electric power $P_{req}$ is calculated, electric power consumption of the high-voltage auxiliary machine 40 in addition to the electric power required by the driving inverter 30 is considered. Also, when the remaining capacity of the secondary battery 26 is equal to or smaller than a predetermined value, the electric power for charging the secondary battery 26 may further be added.

After calculating the required electric power $P_{req}$, whether the required electric power $P_{req}$ is smaller than a predetermined reference value is determined (step S130). In this case, the predetermined reference value corresponds to $P_0$ shown in FIG. 4B. When it is determined that the required electric power $P_{req}$ is smaller than the predetermined reference value in step S130, the intermittent operation mode is selected (step S140), afterwhich the routine ends. When the intermittent operation mode is selected, the operation of the fuel cell system 22 is stopped even when the steady operation mode has been selected until then. Namely, the operations of the fuel gas supplying portion 61 and the blower 64 are stopped to stop supplying the gas to the fuel cell 60. Also, the switch 20 (refer to FIG. 1) is brought into an open state so as to disconnect the fuel cell 60 from the wiring 50. Thus, when the intermittent operation mode is selected and the operation of the fuel cell system 22 is stopped, electric power corresponding to the required electric power $P_{req}$ is supplied to the driving inverter 30 from the secondary battery 26. When the intermittent operation mode is re-selected in step S140 when the intermittent operation mode has been selected, an operation state in which the operation of the fuel cell system 22 is stopped and the required electric power is obtained from the secondary battery 26 is maintained.

When it is determined that the required electric power $P_{req}$ is equal to or larger than a predetermined reference value in step S130, the steady operation mode is selected (step S150), afterwhich the routine ends. When the steady operation mode is selected, the fuel cell system 22 is activated when another operation mode has been selected until then. Namely, the fuel gas supplying portion 61 and the blower 64 are activated to start supplying the gas to the fuel cell 60. Further, at this activation time, the switch 20 (refer to FIG. 1) is brought into a closed state so as to connect the fuel cell 60 to the wiring 50. An operation after the steady operation mode is selected and the fuel cell system 22 is activated will be described later. When it is determined that the braking operation is being performed in step S100, the regenerative operation mode is selected (step S160), afterwhich the routine ends.

Next, control of the steady operation mode based on the gas flow rate will be explained.

Figure 6:
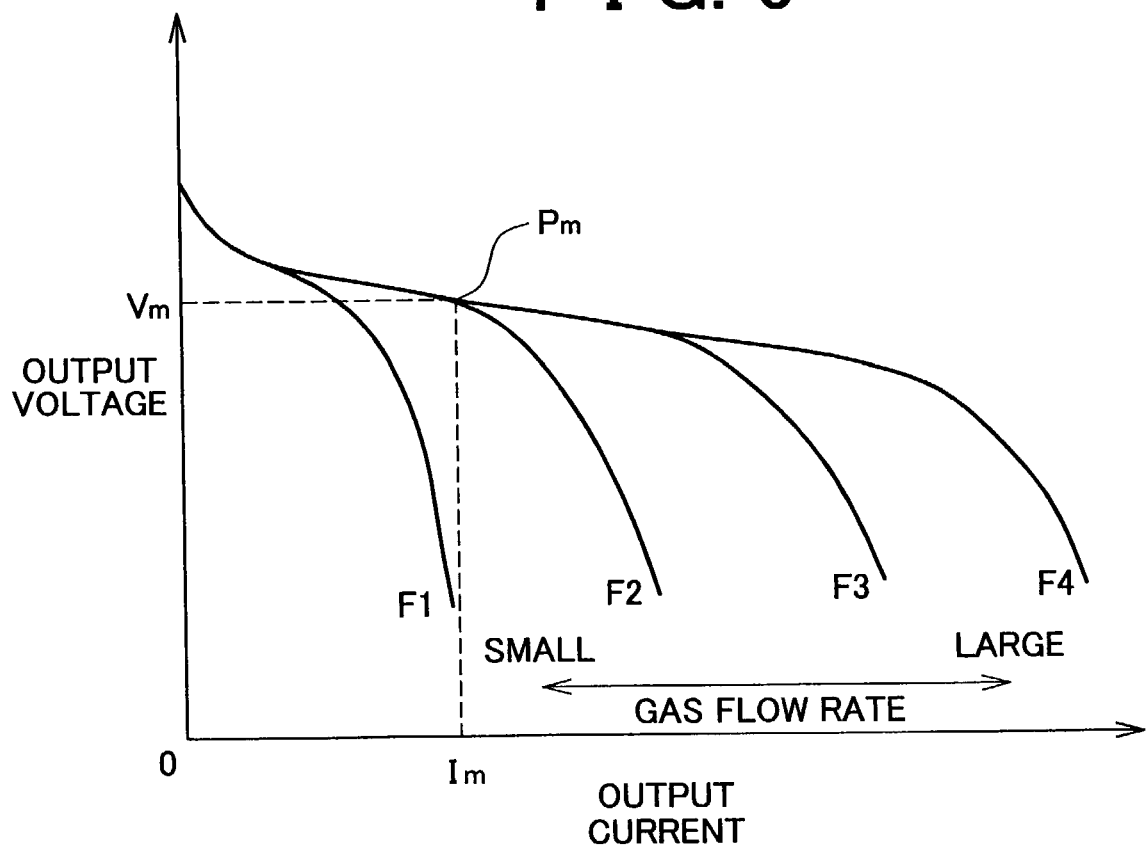
FIG. 6 is an explanatory view showing how an output current-output voltage characteristic in the fuel cell varies depending on a gas flow rate.

In the steady operation mode, the amount of electric power generation is controlled depending on the flow rate of the gas supplied to the fuel cell 60. FIG. 6 is an explanatory view showing how an output current-output voltage characteristic in the fuel cell 60 varies depending on the gas flow rate. FIG. 6 shows how the output current-output voltage characteristic varies with an increase in the amount of supplied gas in the order of F1, F2, F3 and F4.

As shown in FIG. 6, when electric power is generated in the fuel cell 60 by supplying the gas of a predetermined flow rate, the output voltage is gradually decreased with an increase in the output current. Accordingly, the maximum value of the output electric power from the fuel cell 60 which is indicated as a product of the output current and the output voltage becomes a predetermined value, and the maximum value of the output electric power can be determined depending on the amount of the supplied gas. FIG. 6 shows an example in which when the amount of the supplied gas is F2, the output electric power is the maximum value Pm, the output current is Im and the output voltage is Vm at this time.

In the electric vehicle 10 according to the embodiment, the output current-output voltage characteristic corresponding to each gas flow rate for each amount of the supplied gas is stored in the aforementioned ROM included in the control portion 48. In the fuel cell system 22, the amount of the supplied gas is measured, and the maximum value of the electric power which can be output from the fuel cell 60 is determined by referring to the output current-output voltage characteristic. In the electric vehicle 10 according to the embodiment, such maximum value of the output electric power which is determined depending on the amount of supplied gas is the electric power which can be output from the fuel cell 60. In the embodiment, both of the output current-output voltage characteristic when the amount of the hydrogen gas is changed while the oxidizing gas is sufficiently supplied, and the output current-output voltage characteristic when the amount of the oxidizing gas is changed while the hydrogen gas is sufficiently supplied are stored. When the amount of the hydrogen gas and the amount of the oxidizing gas which are supplied to the fuel cell 60 are detected, the amount of the electric power which can be output from the fuel cell 60 is determined with reference to the output current-output voltage characteristic corresponding to the gas flow rate on a side where the gas is more insufficient.

Figure 7:
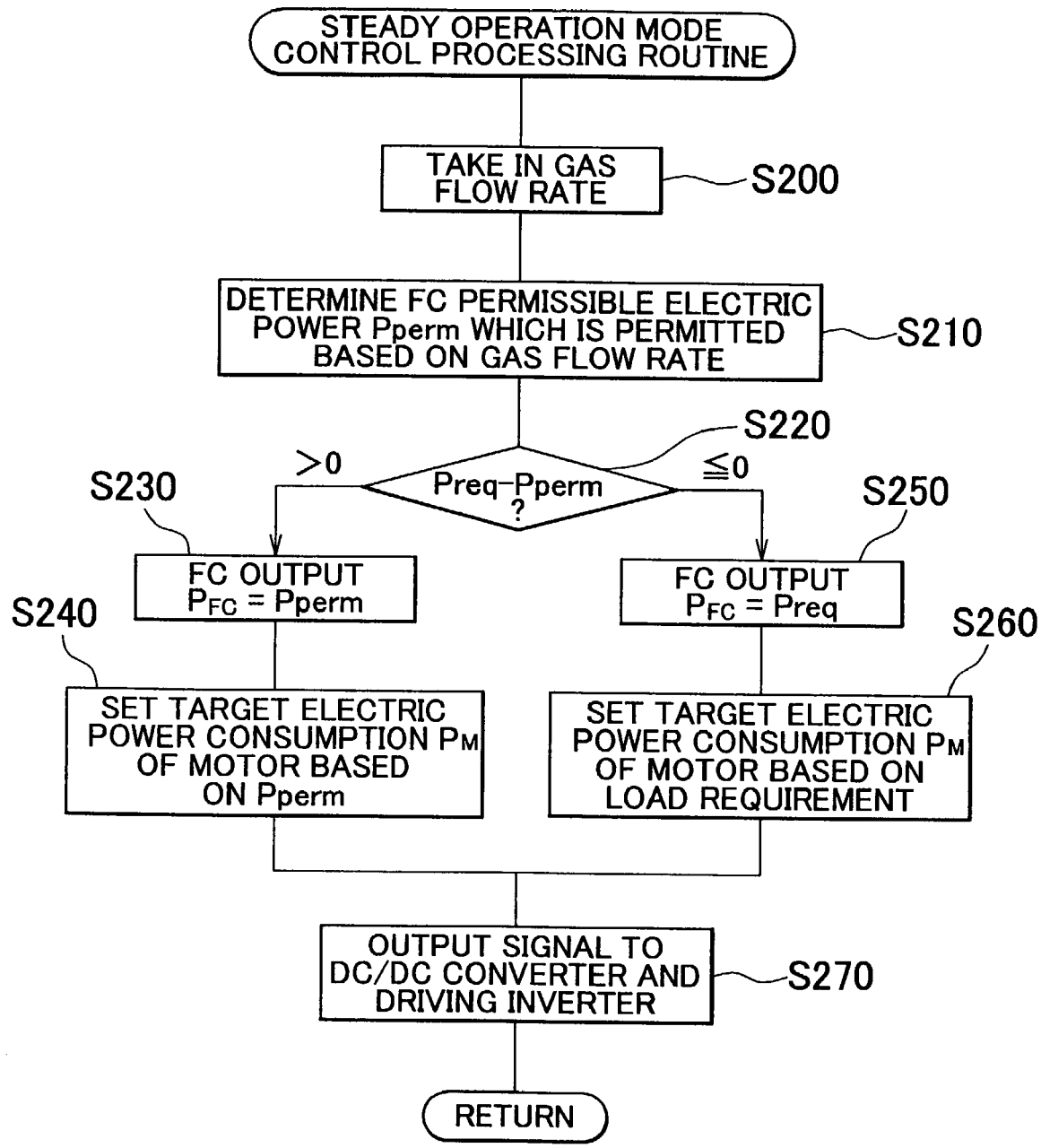
FIG. 7 is a flowchart showing a steady operation mode control processing routine.

FIG. 7 is a flowchart showing the steady operation mode control processing routine which is performed at predetermined intervals in the control portion 48 when the steady operation mode is selected in step S150 in the operation mode determination processing routine shown in FIG. 5. Even when the steady operation mode is selected in step S150 in FIG. 5, a different control is performed when the operation mode is switched from the intermittent operation mode to the steady operation mode, which will be described later.

When the routine is performed, the control portion 48 initially obtains information regarding the flow rate of the hydrogen gas passing through the hydrogen gas supplying passage 62, and the flow rate of the oxidizing gas passing through the oxidizing gas supplying passage 65 from the flow rate sensors 67, 68 (step S200). Then, the electric power $P_{perm}$ which can be output from the fuel cell 60 is determined based on the gas flow rate that is read in step S200 with reference to the output current-output voltage characteristic stored in the ROM of the control portion 48 (step S210). An output voltage $V_{perm}$ from the fuel cell 60 when the output electric power from the fuel cell 60 becomes $P_{perm}$ is also determined with reference to the output current-output voltage characteristic.

When the electric power $V_{perm}$ which can be output from the fuel cell 60 is determined, a difference ($P_{req}-P_{perm}$) between the required electric power $P_{req}$ which is calculated in step S120 in FIG. 5 and the electric power $P_{perm}$ which can be output is calculated (step S220). When ($P_{req}-P_{perm}$) is a positive value, that is, when the required electric power is larger than the electric power which can be output from the fuel cell 60, the electric power $P_{FC}$ which needs to be output from the fuel cell 60 is set as $P_{perm}$ which can be output (step S230).

Then, the target electric power consumption $P_M$ of the driving motor 32 is set based on $P_{perm}$ (step S240). The target electric power consumption $P_M$ is determined as a difference between the electric power $P_{perm}$ which can be output from the fuel cell 60 and the electric power consumption of the high-voltage auxiliary machine 40 at this time. Then, a driving signal is output to the DC/DC converter 28 based on the electric power $P_{FC}$ which needs to be output from the fuel cell 60 that is set in step S230, and a driving signal is output to the driving inverter 30 based on the target electric power consumption $P_M$ which is set in step S240 (step S270), afterwhich the routine ends. Namely, the driving signal is output to the DC/DC converter 28 such that the voltage on the output side becomes $V_{perm}$. Thus, the voltage of the wiring 50 and the output voltage from the fuel cell 60 become $V_{perm}$. Also, the electric power consumption in the driving motor 32 becomes $P_M$ which is set based on $P_{perm}$ by outputting the driving signal to the driving inverter 30 as mentioned above. Accordingly, the output electric power from the fuel cell 60 becomes $P_{FC}=P_{perm}$.

In step S220, when ($P_{req}-P_{perm}$) is equal to or below 0, since the required electric power $P_{req}$ is equal to or smaller than the electric power $P_{perm}$ which can be output from the fuel cell 60, the electric power $P_{FC}$ which needs to be output from the fuel cell 60 set to the required electric power $P_{req}$ (step S250). Then, the target electric power consumption $P_M$ of the driving motor 32 is set based on the aforementioned load requirement (step S260) (refer to step S120 in FIG. 5). Namely, the target electric power consumption $P_M$ is set such that the driving motor 32 consumes the electric power corresponding to the load requirement which is determined based on the vehicle speed and the accelerator opening.

Then, the driving signal is output to the DC/DC converter 28 based on the electric power $P_{FC}$ which needs to be output from the fuel cell 60 that is set in step S250, and the driving signal is output to the driving inverter 30 based on the target electric power consumption $P_M$ which is set in step S260 (step S270), afterwhich the routine ends. At this time, the driving signal is output to the DC/DC converter 28 such that the voltage of the output side becomes the output voltage at which the output electric power from the fuel cell 60 becomes $P_{req}$. The output voltage at which the output electric power from the fuel cell 60 becomes $P_{req}$ is determined based on the aforementioned output current-output voltage characteristic stored in the control portion 48, and the gas flow rate which is read in step S200. Also, the electric power consumption in the driving motor 32 becomes $P_M$ which is set based on the load requirement by outputting the driving signal to the driving inverter 30 as mentioned above. Accordingly, the output electric power from the fuel cell 60 becomes a value corresponding to the load requirement.

When the amount of the supplied gas becomes sufficient with respect to the load requirement as a result of performing the steady operation mode control processing routine in FIG. 7, the electric power which is necessary to perform the required running state in the electric vehicle 10 is generated by the fuel cell 60. Alternatively, when the amount of the supplied gas is insufficient with respect to the load requirement, the fuel cell 60 generates electric power which is commensurate to the amount of the supplied gas. At this time, the magnitude of the acceleration in the electric vehicle 10 becomes insufficient compared with the accelerator opening which is a command value of the acceleration.

In the electric vehicle 10, when the steady operation mode is selected and the fuel cell system 22 is activated, the fuel gas supplying portion 61 and the blower 64 are driven depending on the magnitude of the load requirement such that the necessary amount of the fuel gas and the oxidizing gas are supplied to the fuel cell 60. Therefore, normally the electric power $P_{prem}$ which can be generated by the fuel cell 60 becomes substantially equal to the required electric power $P_{req}$, and the required electric power $P_{req}$ can be generated by the fuel cell 60. However, when the fluctuation of the load requirement is large, the amount of the supplied gas may not sufficiently respond to the load requirement. Accordingly, generation of electric power is controlled based on the flow rate of the gas supplied in the above-mentioned manner, which prevents the output voltage from the fuel cell 60 from being decreased to an undesirable level because generation of electric power becomes excessive with respect to the amount of the supplied gas.

When the target electric power consumption $P_M$ of the driving motor 32 is set based on the electric power $P_{perm}$ that can be generated in step S240, when the remaining capacity of the secondary battery 26 is equal to or larger than a predetermined value, electric power may be supplied to the driving inverter 80 from the secondary battery 26 as well. In this case, the electric power which is output from the secondary battery 26 is determined based on the remaining capacity of the secondary battery 26 that is detected by the remaining capacity monitor 27. Then, a value obtained by adding the electric power output from the secondary battery 26 is set to the target electric power consumption $P_M$ of the driving motor 32. When electric power is supplemented from the secondary battery 26, when the remaining capacity of the secondary battery 26 is sufficient, it becomes possible to perform control such that the target electric power consumption $P_M$ of the driving motor 32 becomes a value corresponding to the load requirement as in the case of step S260.

Also, in step S200, in place of detecting both the flow rate of the hydrogen gas and the flow rate of the oxidizing gas, one of the above-mentioned gas flow rates may be detected, and the electric power $P_{perm}$ which can be output from the fuel cell 60 may be determined based on the detected gas flow rate. For example, when the amount of the oxidizing gas is always insufficient with respect to the amount of the hydrogen gas, the above-mentioned control may be performed by storing the output current-output voltage characteristic regarding only the oxidizing gas and detecting the flow rate of the oxidizing gas.

Next, control when the driving mode of the fuel cell is switched will be explained.

Figure 8:
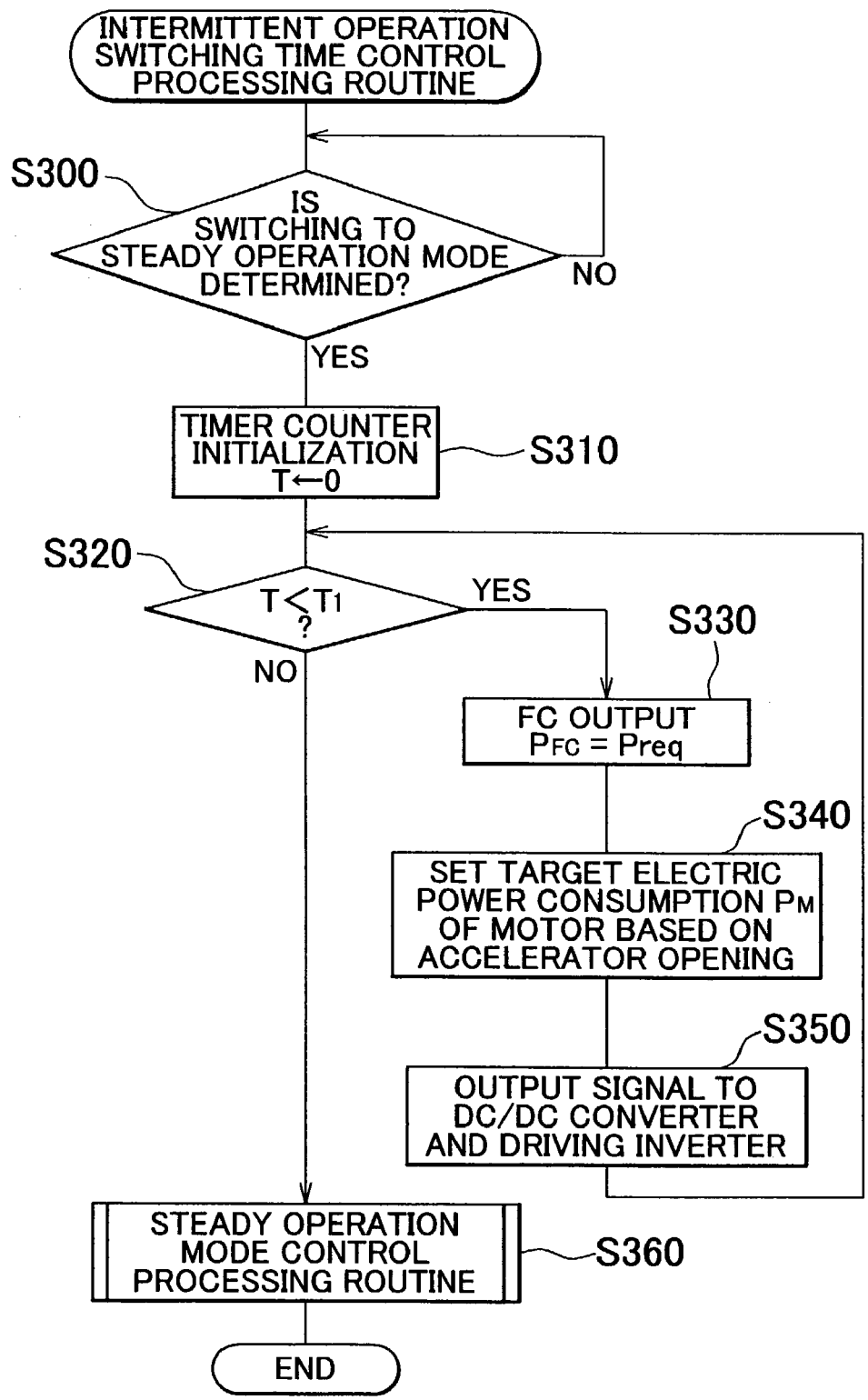
FIG. 8 is a flowchart showing an intermittent operation switching time control processing routine.

FIG. 8 is a flowchart showing the intermittent operation switching time control processing routine. The routine is performed in the control portion 48 when the intermittent operation mode is selected in step S140 in the operation mode determination processing routine shown in FIG. 5. After performing the routine, when the operation mode determination processing routine shown in FIG. 5 is performed next time, whether the steady operation mode is selected is determined (step S300). Namely, whether the operation mode is switched from the intermittent operation mode to the steady operation mode is determined. In the operation mode determination processing routine, when the selected operation state is switched from the intermittent operation mode to the steady operation mode, as mentioned above, the control according to the intermittent operation switching time control processing routine is performed during this period of time without performing the steady operation mode control processing routine shown in FIG. 7. In the operation mode determination processing routine, while the intermittent operation mode is selected in step S140, the process waits while repeatedly making a determination shown in step S300 in the intermittent operation switching control processing routine.

When it is determined that the operation mode is switched from the intermittent operation mode to the steady operation mode in step S300, the control portion 48 initializes a timer counter (not shown) provided therein (step S310). Thus, the time T which has elapsed since the operation mode was switched from the intermittent operation mode to the steady operation mode is measured. When the steady operation mode is selected in step S150 in FIG. 5, and when it is determined that the operation mode is switched to the steady operation mode in step S300 in FIG. 8, as mentioned above, the fuel cell system 22 is activated. Therefore, when the measurement of the elapsed time T is started, the fuel gas supplying portion 61 and the blower 64 are activated so as to start supplying the gas to the fuel cell 60. A driving signal is transmitted to the activated fuel gas supplying portion 61 and the blower 64 so as to supply the fuel cell 60 with an amount of the gas which is necessary for the fuel cell 60 to generate the required electric power $P_{req}$ that is calculated in step S120 in FIG. 5.

Then, whether the elapsed time T is shorter than the predetermined reference time $T_1$ is determined (step S320). When it is determined that the elapsed time T is shorter than the reference time $T_1$, the electric power $P_{FC}$ which needs to be output from the fuel cell 60 is set to the required electric power $P_{req}$ that is calculated in step S120 in FIG. 5 (step S330). Then, the target electric power consumption $P_M$ of the driving motor 32 is set based on the aforementioned load requirement (refer to step S120 in FIG. 5) (step S340). Namely, the target electric power consumption $P_M$ is set such that the driving motor 32 consumes the electric power corresponding to the load requirement which is determined based on the vehicle speed and the accelerator opening. Then, the driving signal is output to the DC/DC converter 28 based on the electric power $P_{FC}$ which needs to be output from the fuel cell 60 that is set in step S330, and the driving signal is output to the driving inverter 30 based on the target electric power consumption $P_M$ which is set in step S340 (step S350). In this case, the processes in steps S330 to S350 are the processes in which the same operation as in steps S250 to S270 in FIG. 7 are preformed.

Then, the process returns to step S320, and the elapsed time T and the reference time $T_1$ are compared. Thus, after the operation mode is switched from the intermittent operation mode to the steady operation mode, control is performed such that the fuel cell 60 generates the electric power corresponding to the required electric power $P_{req}$ without considering the flow rate of the gas supplied to the fuel cell until the predetermined time elapses.

When it is determined that the elapsed time T exceeds the reference time $T_1$ in step S320, the process switches to the steady operation mode control processing routine shown in FIG. 7 (step S360), afterwhich the routine ends. After the process proceeds to the steady operation mode control processing routine, control in which the flow rate of the gas supplied to the fuel cell 60 is considered is performed.

Using the power supply unit 15 according to the embodiment which is configured in the above-mentioned manner, a driving force corresponding to the load requirement can be secured when the operation mode is switched from the intermittent operation mode to the steady operation mode. Namely, acceleration corresponding to the accelerator opening can be performed using the fuel cell 60 in the electric vehicle 10 when the operation mode is switched to the steady operation mode.

When the operation mode is switched from the intermittent operation mode to the steady operation mode, and the fuel cell system 22 is activated, it takes a predetermined time for the fuel gas supplying portion 61 and the blower 64 to reach the steady state in which the amount of gas corresponding to the driving signal can be supplied. Accordingly, for a while after the activation (for example, for 1 to 3 seconds), the amount (the amount which is necessary to generate the required electric power $P_{req}$) of gas corresponding to the driving signal cannot be supplied to the fuel cell 60. Therefore, when the control according to the steady operation mode control processing routine shown in FIG. 7 is performed from the start, when the operation mode is switched to the steady operation mode, it is determined that the electric power $P_{perm}$ which can be output from the fuel cell 60 that is based on the amount of the supplied gas is smaller than the required electric power $P_{req}$. When such a determination is made, the electric power consumption of the driving motor 32 is suppressed. Accordingly, the required acceleration cannot be obtained in the electric vehicle.

In contrast to this operation, in the electric vehicle 10 according to the embodiment, acceleration corresponding to the load requirement can be performed during a period of time from when the operation mode is switched to the steady operation mode until when a predetermined time elapses. Such control is possible because a predetermined amount of gas remains inside the hydrogen gas supplying passage 62 and the oxidizing gas supplying passage 65. Namely, when the intermittent operation mode is selected and the operation of the fuel cell system 22 is stopped, although the operations of the fuel gas supplying portion 61 and the blower 64 are stopped, the hydrogen gas and the oxidizing gas remain inside the hydrogen gas supplying passage 62 and the oxidizing gas supplying passage 65, respectively. In the embodiment, the electric power which exceeds the electric power $P_{perm}$ that can be generated and that is determined based on the detected gas flow rate is generated by the fuel cell 60, using the predetermined amount of the gas which has already been in these passages. Thus, when the operation mode is switched, despite the fact that the gas flow rate detected by the flow rate sensors 67, 68 becomes too insufficient to generate the required electric power $P_{req}$, the required electric power $P_{req}$ is generated by the fuel cell 60.

Thus, since the control is performed using the gas which remains inside the gas passages, the reference time $T_1$ which is used when the determination shown in step S320 in FIG. 8 is made needs to be determined based on the volume of the hydrogen gas supplying passage 62 and the oxidizing gas supplying passage 65. It is necessary to preset the time in which the electric power estimated to be required at the normal acceleration time when the operation mode is switched can be generated using the gas that remains inside the passage. Thus, when the reference time $T_1$ in which control without considering the detected gas flow rate is performed is determined depending on the amount of the gas which remains in the passages, the fuel gas supplying portion 61 and the blower 64 are not necessarily brought into the steady state after the reference time $T_1$ elapses. However, by performing the above-mentioned control, deterioration of the response of the output to the load requirement can be suppressed for a predetermined period of time after the activation of the fuel cell system 22, when the operation mode is switched to the steady operation mode.

When the operation mode is switched from the intermittent operation mode to the steady operation mode, the remaining capacity of the secondary battery 26 may be decreased due to the fact that the secondary battery 26 produces an output during the intermittent operation mode. Even when the remaining capacity of the secondary battery 26 is insufficient, the required running state can be secured without supplementing the electric power from the secondary battery 26 by performing the control shown in FIG. 8. Also, when the remaining capacity of the secondary battery 26 is decreased during the intermittent operation mode, it is preferable that the secondary battery 26 should not be charged by the fuel cell 60 while the intermittent operation switching time control processing routine is performed. Accordingly, the running state corresponding to the load requirement can be sufficiently secured in the electric vehicle 10 when the operation mode is switched to the steady operation mode.

Next, a second embodiment according to the invention will be explained.

Figure 9:
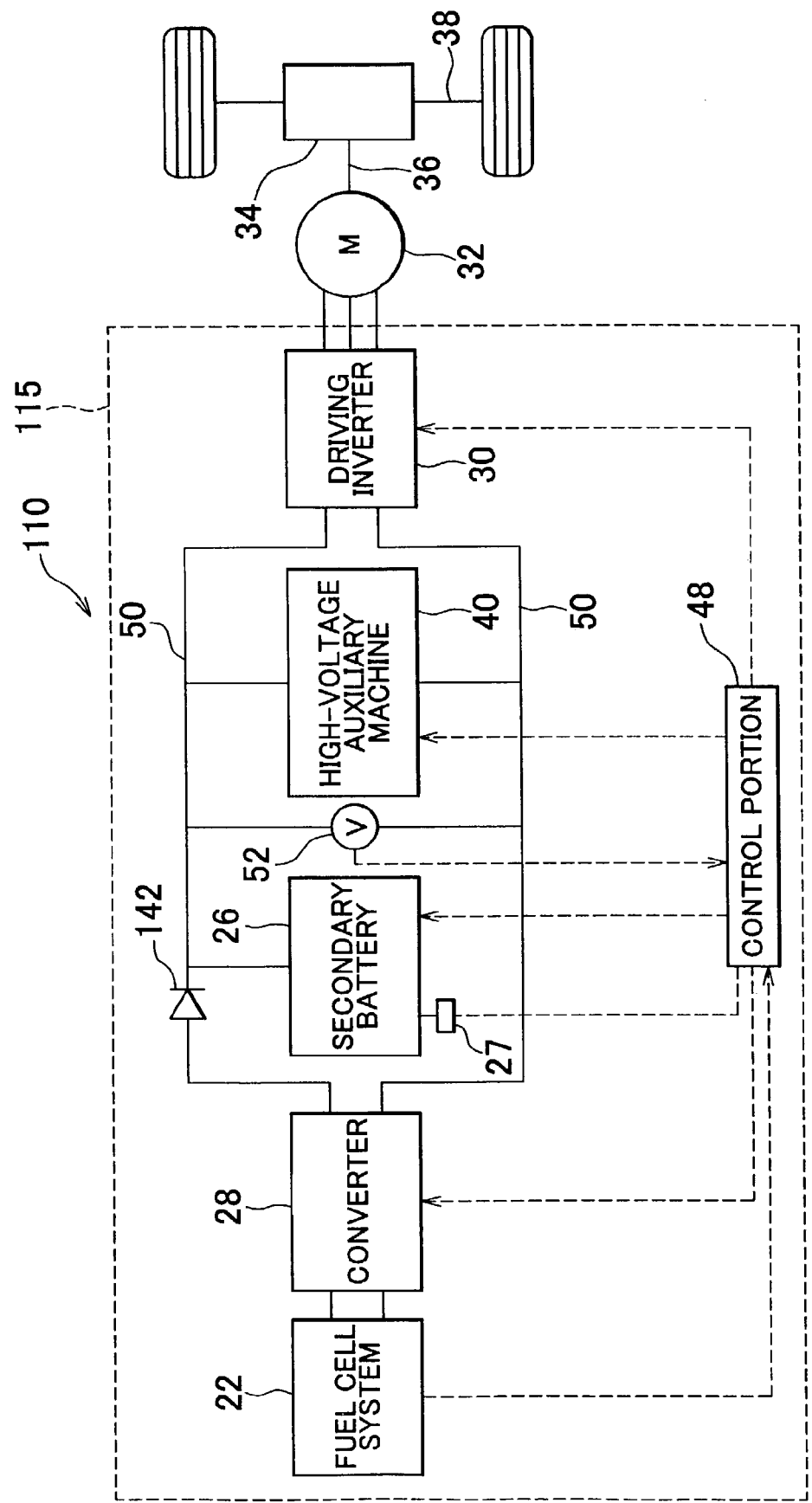
FIG. 9 is an explanatory view showing a configuration of an electric vehicle according to a second embodiment.

FIG. 9 is an explanatory view showing a structure of an electric vehicle 110 according to the second embodiment. The electric vehicle 110 includes a power supply unit 115. In the electric vehicle 110 shown in FIG. 9, the same reference numerals will be assigned to the same portions as in the first embodiment, and a detailed explanation will be omitted. In the electric vehicle 110, the connection between the fuel cell system 22 and the secondary battery 26 is different from that in the electric vehicle 10. In the electric vehicle 110, the secondary battery 26 is directly connected to the wiring 50, and the fuel cell 60 is connected to the wiring 50 through the DC/DC converter 28.

Figure 10A:
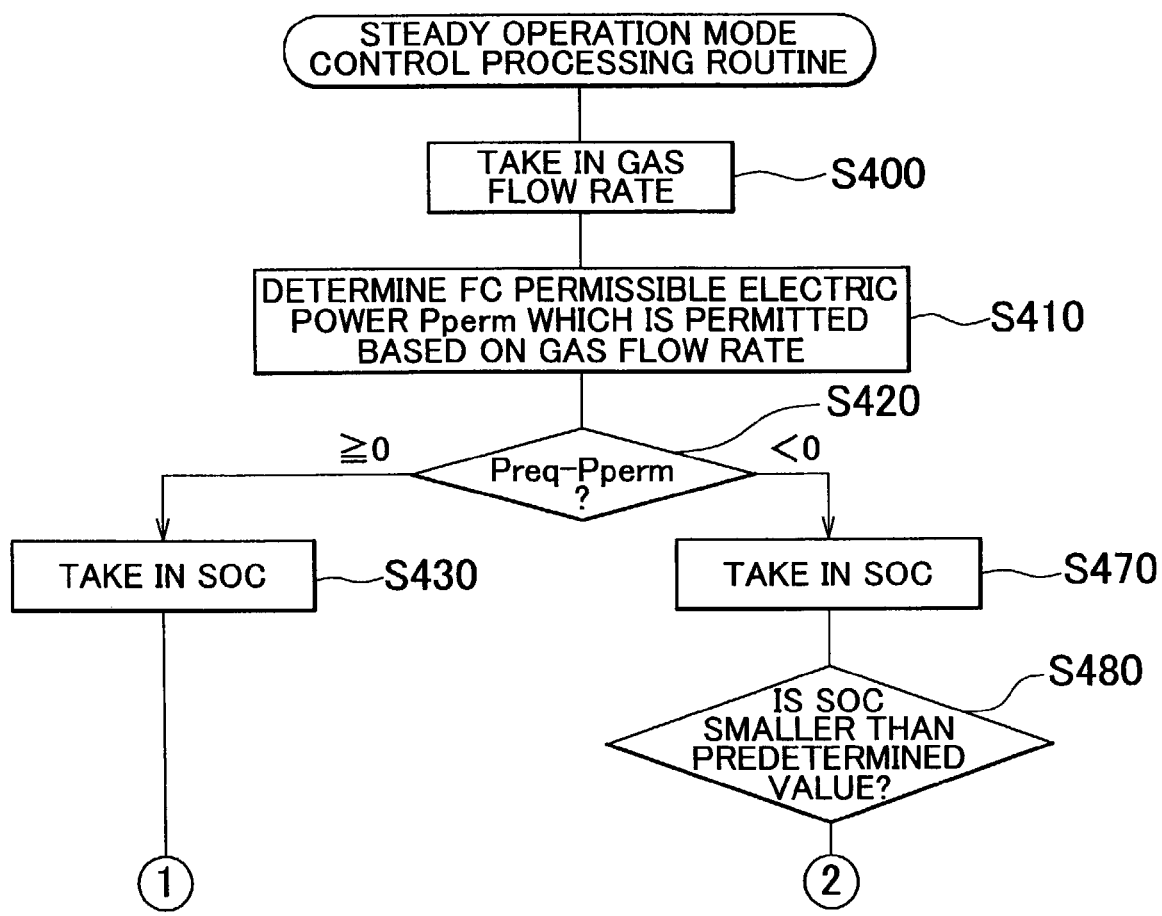

In the electric vehicle 110 as well, the same process as the operation mode determination processing routine shown in FIG. 5 is performed to switch the operation state in accordance with the load requirement and the braking state. FIG. 10 is a flowchart showing the steady operation mode control processing routine which is performed by the control portion 48 of the electric vehicle 110 when the steady operation mode is selected by performing the operation mode determination processing routine.

When the routine is performed, the control portion 48 obtains information regarding the flow rate of the hydrogen gas and the flow rate of the oxidizing gas from the flow rate sensors 67, 68 (step S400).

Then, the electric power $P_{perm}$ which can be output from the fuel cell 60 at this time is determined based on the gas flow rate read in step S400 with reference to the aforementioned output current-output voltage characteristic stored in the ROM of the control portion 48 (step S410). When the electric power $P_{perm}$ which can be output from the fuel cell 60 is determined, a difference ($P_{req}-P_{perm}$) between the required electric power $P_{req}$ which is calculated in step S120 shown in FIG. 5 and the electric power $P_{perm}$ which can be output is calculated (step S420). The processes which are performed in steps S400 to S420 are the same as the processes in steps S200 to S220 in the steady operation mode control processing routine shown in FIG. 7.

When ($P_{req}-P_{perm}$) calculated in step S420 is equal to or above 0, that is, when the required electric power is equal to or larger than the electric power which can be output from the fuel cell 60, the remaining capacity (SOC) of the secondary battery 26 that is detected by the remaining capacity monitor 27 is taken in (step S430). Then, the output voltage from the secondary battery 26 is determined based on SOC which is taken in (step S440).

In this case, the control portion 48 stores data regarding the output current-output voltage characteristic of the secondary battery 26 in addition to the data regarding the output current-output voltage characteristic of the fuel cell 60 in the ROM. FIG. 11 is an explanatory view showing an example of the data which is stored in the control portion 48. As shown in FIG. 11, the output current-output voltage characteristic of the secondary battery 26 varies depending on SOC. When the SOC is determined, the output current-output voltage characteristic at this time is determined. FIG. 11 shows that the output current-output voltage characteristic becomes G1, G2, . . . , G5 in the increasing order of SOC. When SOC is taken in step S430, the control portion 48 reads the output current-output voltage characteristic corresponding to the SOC from the ROM. Then, in step S440, the output voltage from the secondary battery 26 for outputting the electric power corresponding to ($P_{req}-P_{perm}$) calculated in step S420 to the secondary battery 26 is determined based on the read output current-output voltage characteristic.

More specifically, for example, assuming that a characteristic G3 in FIG. 11 is read as the output current-output voltage characteristic corresponding to the detected SOC, the control portion 48 calculates a point at which the product of the output voltage and the output current (that is, the output electric power from the secondary battery 26) becomes substantially equal to ($P_{req}-P_{perm}$) in the read characteristic G3. Assuming that this point is $P_n$ shown in FIG. 1, the output voltage $V_1$ from the secondary battery 26 at the point $P_n$ is determined as the output voltage required by the secondary battery 26 in step S440.

Next, the control portion 48 outputs a driving signal to the DC/DC converter 28 using the output voltage $V_n$ from the secondary battery 26 which is set in step S440 as a command value of the output side, and outputs the driving signal to the driving inverter 30 based on the load requirement (step 450). Thus, the voltage of the wiring 50 and the output voltage from the secondary battery 26 become $V_n$, and the electric power $P_n$ is output from the secondary battery 26. At this time, the electric power $P_{perm}$ corresponding to the gas flow rate is output from the fuel cell 60, and the required electric power $P_{req}$ is output from the entire power supply unit 115 (step S460), afterwhich the routine ends.

Meanwhile, when ($P_{req}-P_{perm}$) calculated in step S420 is below 0, that is, when the electric power which can be output from the fuel cell 60 is larger than the required electric power, the remaining capacity (SOC) of the secondary battery 26 which is detected by the remaining capacity monitor 27 is taken in (step S470). Then whether this SOC is smaller than a predetermined value is determined (step S480). The predetermined value which is used for the determination in step S480 is a value which is preset and stored in the ROM of the control portion 48 as a value for determining whether the secondary battery 26 needs to be charged.

When it is determined that the SOC is smaller than the predetermined value, that is, when it is determined that the secondary battery 26 needs to be charged, the output voltage from the secondary battery 26 is determined (step S490). At this time, the output current-output voltage characteristic corresponding to the SOC which is read in step 470 is initially read from the ROM. Then, the output voltage from the secondary battery 26 for outputting the electric power corresponding to ($P_{req}$–$P_{perm}$) which is calculated in step S420 using the secondary battery 26 is determined based on the read output current-output voltage characteristic.

More specifically, for example, assuming that the characteristic G3 in FIG. 11 is read as the output current-output voltage characteristic corresponding to the detected SOC in the same manner as mentioned above, when the output current-output voltage characteristic is read, the control portion 48 calculates a point at which the product of the output voltage and the output current (that is, the output current from the secondary battery 26) becomes substantially equal to ($P_{req}$–$P_{perm}$) in the read characteristic G3. In this case, since ($P_{req}$–$P_{perm}$) is below 0, a point at which the output electric power from the secondary battery 26 becomes negative, that is, a point at which the output current from the secondary battery 26 becomes negative is calculated. Assuming that the point is $P_r$ in FIG. 11, the output voltage $V_r$ from the secondary battery 26 at the point $P_r$ is determined as the output voltage required by the secondary battery 26 in step S440.

Next, the control portion 48 outputs the driving signal to the DC/DC converter 28 using the output voltage $V_r$ from the secondary battery 26 which is set in step S490 as a command value of the output side, and outputs the driving signal to the driving inverter 30 based on the load requirement (step S500). Accordingly, the voltage of the wiring 50 and the output voltage from the secondary battery 26 become $V_r$, and electric power is stored in the secondary battery 26. At this time, the electric power $P_{perm}$ corresponding to the gas flow rate is output from the fuel cell 60, and accordingly the required electric power $P_{req}$ is provided and the secondary battery 26 is charged with the output electric power from the fuel cell (step 510), afterwhich the routine ends.

Also, even when it is determined that SOC is equal to or larger than the predetermined value, that is, when it is determined that the secondary battery 26 needs not be charged, the output voltage from the secondary battery 26 is determined next (step S520). At this time as well, the output current-output voltage characteristic corresponding to the SOC which is read in step S470 is read from the ROM. Then, the output voltage required by the secondary battery 26 when the output electric power from the secondary battery 26 becomes equal to 0 is determined based on the read output current-output voltage characteristic.

More specifically, for example, assuming that the characteristic G5 in FIG. 11 is read as the output current-output voltage characteristic corresponding to the detected SOC, when the output current-output voltage characteristic is read, the control portion 48 calculates a point at which the product of the output voltage and the output current (that is, the output electric power from the secondary battery 26) in the read characteristic G5. In this case, the point at which the output current from the secondary battery 26 becomes substantially equal to 0 is calculated. Assuming that the point is $P_s$ shown in FIG. 11, the output voltage $V_s$ from the secondary battery 26 at the point $P_s$ is determined as the output voltage required by the secondary battery 26 in step S520.

Next, the control portion 48 outputs the driving signal to the DC/DC converter 28 using the output electric power $V_s$ from the secondary battery 26 which is set in step S520 as the command value of the output side, and outputs the driving signal to the driving inverter 30 based on the load requirement (step S530). Accordingly, the voltage of the wiring 50 and the output voltage from the secondary battery 26 becomes $V_s$, and the secondary battery 26 is not charged or discharged. At this time, the required electric power $P_{req}$ is output from the fuel cell 60, and the electric power corresponding to the load requirement is consumed by the driving motor 32 through the driving inverter 30 (step S540), afterwhich the routine ends.

In this case, the electric power taken out from the fuel cell 60 corresponds to the load requirement, and does not coincide with the electric power $P_{perm}$ which can be generated, and which is determined based on the gas flow rate in step S410. In such a case, the operation point of the fuel cell 69 deviates from a point at which generation of electric power becomes maximum with respect to the gas flow rate.

Figure 12:
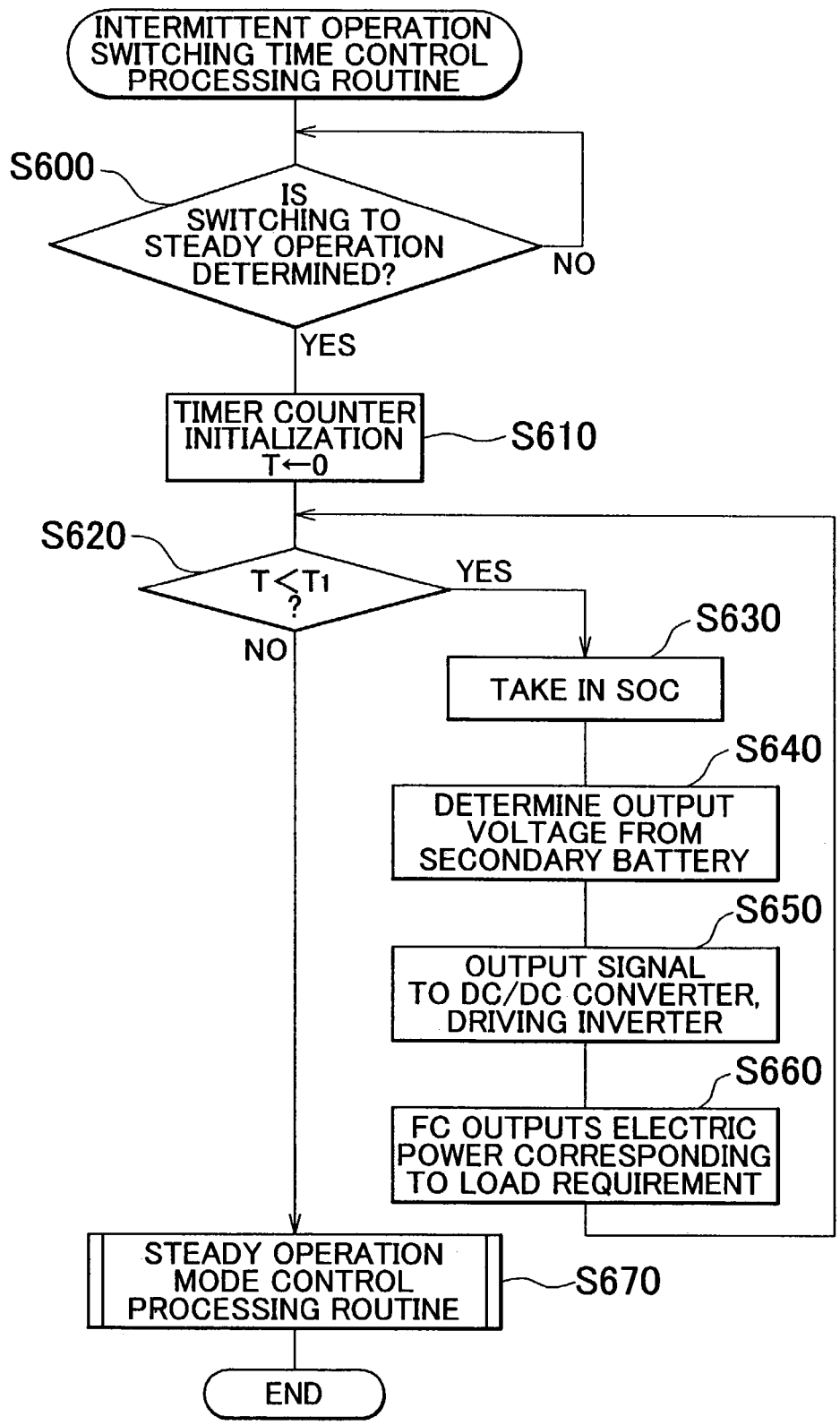
FIG. 12 is a flowchart showing the intermittent operation switching time control processing routine which is performed in the control portion of the electric vehicle.

FIG. 12 is a flowchart showing the intermittent operation switching time control processing routine which is performed in the control portion 48 of the electric vehicle 110. The routine is performed in the control portion 48 at the time of performing the same process as the operation mode determination processing routine shown in FIG. 5 when the intermittent operation mode is selected in step S140. When the routine is performed, the same processes as steps S300 to S320 shown in FIG. 8 are performed as processes of steps S600 to S620. Namely, whether the operation mode is switched from the intermittent operation mode to the steady operation mode is determined, and when the operation mode is switched, the control according to the intermittent operation switching time control processing routine is performed without performing the steady operation mode control processing routine shown in FIG. 10. Then, the time elapsed since the operation mode was switched from the intermittent operation mode to the steady operation mode is measured, and whether the elapsed time T is shorter than the predetermined reference time $T_1$ is determined.

When it is determined that the operation mode is switched to the steady operation mode in step S600, as mentioned above, the fuel cell system 22 is activated. Accordingly, when the measurement of the elapsed time T is started, the fuel gas supplying portion 61 and the blower 64 are activated such that gas supply to the fuel cell 60 is started, and the fuel cell 60 is connected to the wiring 50. At this time, the driving signal is transmitted to the activated fuel gas supplying portion 61 and the blower 64 such that an amount of gas which is necessary for the fuel cell 60 to generate the required electric power $P_{req}$ calculated in step S120 in FIG. 5 is supplied to the fuel cell 60.

When it is determined that the elapsed time T is shorter than the reference time $T_1$ in step S620, the control portion 48 takes in the SOC (step S630). Then, the output voltage from the secondary battery 26 is determined based on the SOC (step S640). In this case, the output voltage from the secondary battery 26 is determined as the output voltage $V_s$ at which the output current from the secondary battery 26 becomes substantially equal to 0 based on the output current-output voltage characteristic of the secondary battery 26 in SOC, in the same manner as step S520 in FIG. 10.

Then, in the same manner as step S530 in FIG. 10, the driving signal is output to the DC/DC converter 28 using the output voltage $V_s$ from the secondary battery 26 as a command value of the output side, and the driving signal is output to the driving inverter 30 based on the load requirement (step S650). Accordingly, the fuel cell 60 outputs the electric power corresponding to the required electric power $P_{req}$ regardless of the gas flow rate. The processes in steps S630 to S660 are processes in which the same operations as in step S470 and steps S520 to S540 in FIG. 10 are performed.

Then, the process returns to step S620, and the elapsed time T and the reference time $T_1$ are compared. After the operation mode is switched from the intermittent operation mode to the steady operation mode, control is performed such that the fuel cell 60 generates the electric power corresponding to the required electric power $P_{req}$ without considering the flow rate of the gas supplied to the fuel cell until the predetermined time elapses.

When it is determined that the elapsed time T exceeds the reference time $T_1$ in step S620, the process proceeds to the steady operation mode control processing routine shown in FIG. 10 (step S670), after which the routine ends. By proceeding to the steady operation mode control processing routine, the normal operation in which the flow rate of the gas supplied to the fuel cell 60 is considered is performed thereafter.

Using the power supply unit according to the embodiment which is configured in the above-mentioned manner, as well as the first embodiment, when the operation mode is switched from the intermittent operation mode to the steady operation mode, the driving force corresponding to the load requirement can be secured. Namely, when the operation mode is switched to the steady operation mode, the acceleration corresponding to the accelerator opening can be performed using the fuel cell 60 in the electric vehicle 10. At this time, the electric power corresponding to the required electric power $P_{req}$ is generated using the gas which remains in the hydrogen gas supplying passage 62 and the oxidizing gas supplying passage 65 in the fuel cell 60. While control in which the gas flow rate is not considered is being performed, the electric power supplied to the driving inverter 30 is secured by not charging the secondary battery 26 regardless of the remaining capacity of the secondary battery 26.

It should be appreciated that the invention is not limited to the above-mentioned embodiments, and can be embodied in various forms without departing from the true spirit of the invention. For example, the following modifications are possible as well.

In the embodiment, the flow rate of the gas supplied to the fuel cell 60 is determined based on result detected by the flow rate sensors 67, 68. However, a different structure may be adopted as long as the flow rate of the gas supplied to the fuel cell 60 is determined based on a value reflecting the gas flow rate. For example, in place of directly detecting the flow rate of the oxidizing gas, gas flow rate may be calculated by reading the rotational speed of the blower 64.

In the above-mentioned embodiment, the hydrogen gas is used as a fuel gas supplied to the anode side of the fuel cell 60. However, the reformed gas may be used. In such a case, an amount of the generated reformed gas is adjusted depending on generation of electric power which is required by the fuel cell 60. Then, by applying the invention before generation of the reformed gas is brought into the steady state at the time of switching the operation mode from the intermittent operation mode to the steady operation mode, decrease of the power which can be obtained with respect to the load requirement at the switching time can be suppressed.

Also, in the embodiment, the control method of the invention in which the gas flow rate is not considered is performed when the operation mode is switched from the intermittent operation mode to the steady operation mode. However, the control method can be applied to another state as long as the fuel cell system is being activated. In the case in which the gas remains in the pipe when the operation of the fuel cell system is stopped, the same control can be performed.

What is claimed is:

1. A control method of a power supply system in which a fuel cell and a battery are connected in parallel by a power supply wiring, comprising the steps of:
    activating the fuel cell, which has stopped generating electric power, in response to a request to apply a load which is larger than zero to the fuel cell;
    obtaining a load requirement that indicates electric power that is required by the power supply system;
    measuring a time which has elapsed since the fuel cell was activated;
    obtaining information regarding an amount of fuel actually supplied to the fuel cell;
    comparing the elapsed time with a predetermined reference time;
    setting a target electric power which needs to be output from the fuel cell based on the obtained load requirement without considering the obtained information regarding the amount of the fuel actually supplied to the fuel cell when it is determined that the elapsed time is equal to or shorter than the reference time; and
    setting the target electric power which needs to be output from the fuel cell in accordance with the obtained information regarding the amount of the fuel actually supplied to the fuel cell when it is determined that the elapsed time exceeds the reference time.

2. The control method of the power supply system according to claim 1, wherein the power supply system further includes a first operation mode in which operation of the fuel cell is stopped and electric power is supplied to a load by the battery, and a second operation mode in which electric power is generated using the fuel cell, and continuing the operation of the power supply system while switching between the first operation mode and the second operation mode depending on the load requirement, the activation of the fuel cell being performed when the operation mode is switched from the first operation mode to the second operation mode.

3. A power supply system, comprising:
    a fuel cell;
    a battery which is connected to the fuel cell in parallel by power supply wiring;
    a load requirement obtaining portion which obtains a load requirement that indicates electric power required of the power supply system;
    an elapsed time measuring portion which measures time that has elapsed since the fuel cell was activated, prior to the fuel cell having been activated, the fuel cell being in a state in which the fuel cell has stopped generating electric power, the fuel cell having been activated in response to a request to apply a load which is larger than zero to the fuel cell;
    a supplied fuel amount detecting portion which detects an amount of fuel that is supplied to the fuel cell;
    a target power setting portion which sets a target electric power that needs to be output from the fuel cell; and
    a control portion which controls the fuel cell such that the fuel cell outputs the target electric power that is set by the target power setting portion,
    wherein the target power setting portion sets (i) the target electric power based on the obtained load requirement without considering the detected amount of the fuel that is supplied to the fuel cell when the elapsed time which is measured by the elapsed time measuring portion is equal to or shorter than a predetermined reference time, and (ii) sets the target electric power based on the detected amount of the fuel that is supplied to the fuel cell when the elapsed time which is measured by the elapsed time measuring portion exceeds the predetermined reference time.

4. The power supply system according to claim 3, further comprising:
   an operation state switching portion which switches the power supply system between a first operation mode in which operation of the fuel cell is stopped and electric power is supplied to the load by the battery and a second operation mode in which electric power is generated using the fuel cell, depending on the load requirement,
   wherein the elapsed time measuring portion measures time which has elapsed since the fuel cell was activated when the operation mode is switched from the first operation mode to the second operation mode.

5. The power supply system according to claim 3, wherein the battery is a secondary battery which is connected to the power supply wiring through a DC/DC converter, and the control portion sets an output voltage at which the fuel cell outputs the target electric power that is set by the target power setting portion as an output voltage from the DC/DC converter.

6. The power supply system according to claim 5, further comprising:
   an inverter which is connected to the power supply wiring, and which outputs electric power that is output from the fuel cell and/or the secondary battery to a predetermined external load,
   wherein the control portion drives the inverter such that the load consumes electric power corresponding to the load requirement when the elapsed time measured by the elapsed time measuring portion is equal to or shorter than a predetermined reference time.

7. The power supply system according to claim 3, further comprising:
   a DC/DC converter which converts a voltage when electric power output from the fuel cell is transmitted to the power supply wiring,
   wherein the battery is a secondary battery, and the control portion sets an output voltage from the DC/DC converter such that a voltage in the power supply wiring becomes a voltage at which the secondary battery is not charged or discharged when the elapsed time that is measured by the elapsed time measuring portion is equal to or shorter than a predetermined reference time.

8. The power supply system according to claim 7, further comprising:
   an inverter which is connected to the power supply wiring and which outputs electric power output from the fuel cell and/or the secondary battery to the predetermined external load,
   wherein the control portion drives the inverter such that the load consumes electric power corresponding to the load requirement when the elapsed time measured by the elapsed time measuring portion is equal to or shorter than a predetermined time.

\* \* \* \* \*